March 17, 1959

H. B. SEDGFIELD ET AL 2,878,006

GYROSCOPIC APPARATUS FOR MEASURING RATE
OF TURN AND LINEAR ACCELERATION

Filed Nov. 24, 1953

INVENTORS
HUGH B. SEDGFIELD
FREDERICK ERRINGTON
BY
Herbert H. Thompson
ATTORNEY

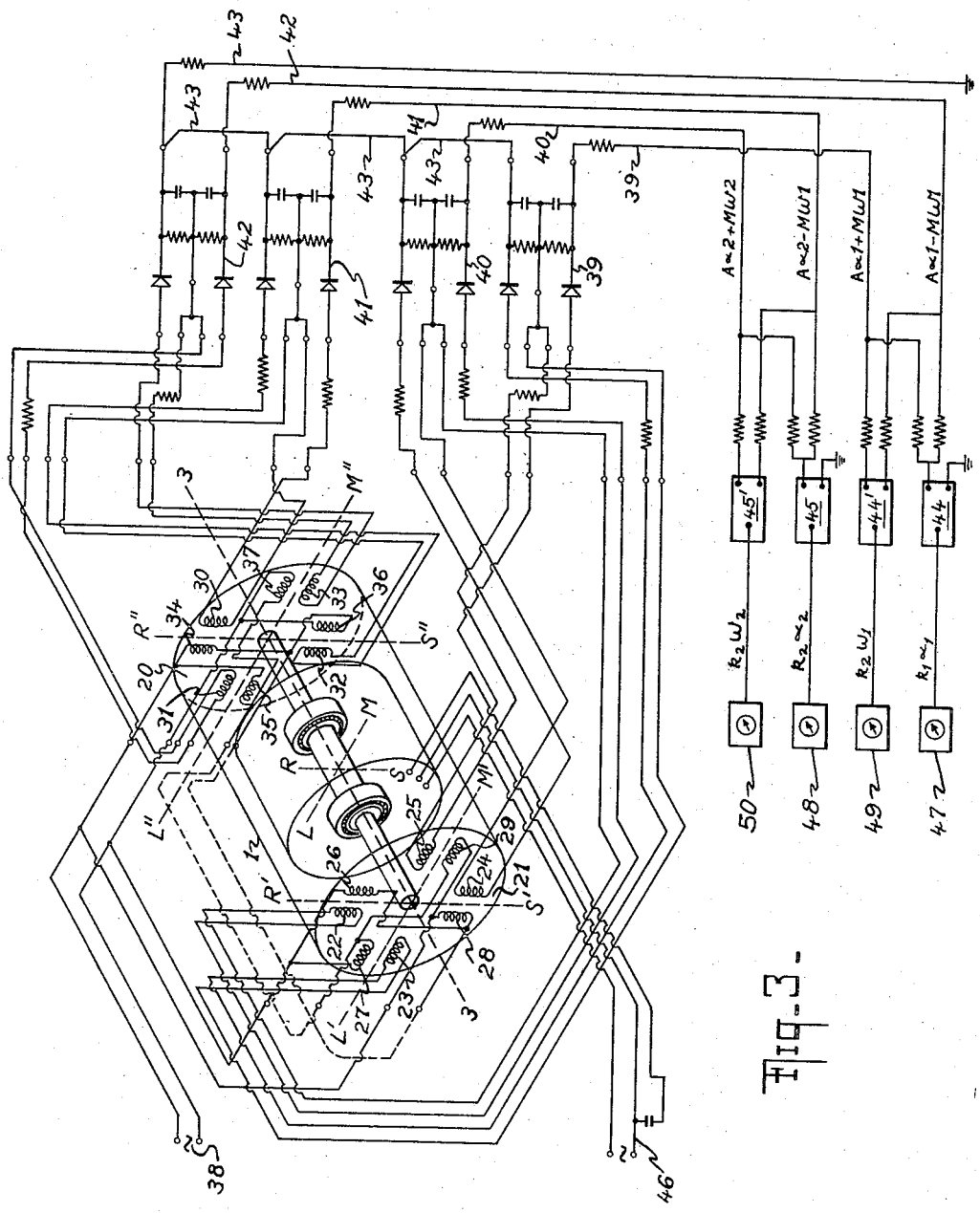

United States Patent Office 2,878,006
Patented Mar. 17, 1959

2,878,006

GYROSCOPIC APPARATUS FOR MEASURING RATE OF TURN AND LINEAR ACCELERATION

Hugh Brougham Sedgfield, Hampton, and Frederick Errington, Crouch End, London, England, assignors to The Sperry Gyroscope Company Limited, Brentford, England, a company of Great Britain Application November 24, 1953, Serial No. 394,122

Claims priority, application Great Britain December 17, 1952

9 Claims. (Cl. 264—1)

This invention relates to apparatus for providing measures of the rate of turn and/or lateral accelerations of a support such as a craft or missile. According to the invention a gyro unit for use in such apparatus comprises a rotor mounted in a supporting frame in such a manner as to be capable of spinning about an axis and as to be capable of limited restrained angular movement about an axis perpendicular to the spin axis and of limited restrained lateral movement in directions lateral to the spin axis, and pick-off means adjacent each end of the rotor for providing measures, in magnitude and sense, of the displacements of the ends of the rotor from their normal zero positions with respect to the pick-off means.

Preferably, the gyro unit comprises a rotor mounted for spinning about an axis in a supporting frame by means of a slightly flexible shaft whose ends are supported in mountings which permit slight bending of the shaft but prevent lateral displacements of the shaft at the points of support and pick-off means adjacent each end of the shaft for providing measures, in magnitude and sense, of the displacements of the ends of the shaft from their normal zero positions with respect to the pick-off means.

The apparatus may be used to measure rate of turn of the support, and, therefore, of a craft on which the apparatus is carried. Thus, if the support for the rotor is turning about an axis perpendicular to the rotor axis, the gyroscopic reaction torque set up will cause the flexible shaft to bend in the form of a shallow S in a plane containing the rotor axis and the axis about which the support is turned. As a result, the ends of the shaft will be deflected in opposite directions in the said plane to the same extent if the rotor and its mountings are symmetrical, end to end, of the shaft axis, but possibly to different extents if the rotor and its mountings are not symmetrical. Each of the deflections constitutes, on an appropriate scale, a measure of the rate of turn of the support about the axis referred to, the scales of proportionality being possibly different for the two ends, and the pick-off means at either end may be arranged to detect the displacement of that end of the shaft and to provide an output that is a measure of the rate of turn. However, such a measure is of little use on a craft since the rotor shaft will bend not only in response to turn of the craft, but also in response to lateral acceleration of the support so that the deflection of either end of the shaft depends both on the rate of turn of the support and on any lateral acceleration of the support.

When the support is subjected to a lateral acceleration, the flexible shaft bends in the form of a shallow U in a plane containing the rotor axis and the direction in which the acceleration occurs, with the result that the ends of the shaft are also deflected during such accelerations in the same direction as the acceleration. Thus a deflection of one end of the shaft in a particular direction may be due to acceleration of the craft in that direction and/or to a rate of turn of the craft about an axis in that direction, and measurements of the deflection of one end of the shaft cannot determine whether the deflection is due to a rate of turn about that direction and/or to a lateral acceleration in that direction. Nevertheless, although acceleration of the craft in a given direction and turning of the craft about an axis in that direction cause the two ends of the shaft both to deflect parallel to the direction in question, the deflections of the two ends of the shaft produced when both causes are operating are different. Accordingly, it is possible to use this difference to distinguish between acceleration in the direction in question and a rate of turn about an axis in that direction. For this purpose the measures of the deflections at the two ends are combined to derive a measure of the rate of turn about an axis in the direction referred to free from error due to acceleration in that direction.

Gyroscopic apparatus according to the invention may therefore include means for combining the outputs of the pick-off means at the two ends of the rotor shaft constituting measures of the deflections of the two ends of the shaft parallel to the same direction lateral to the shaft in order to derive a measure of the rate of turn of the support or craft.

If the rotor, shaft, mountings, and pick-off arrangements, are not symmetrical end to end in construction and arrangement, the deflection of the ends of the shaft parallel to a given direction may be unequal for a given rate of turn about that direction, and may be also unequal for a given lateral acceleration parallel to that direction. In general, provided that the outputs of the pick-off means in response to a rate of turn or a lateral acceleration are proportional to the rate of turn or to the acceleration as the case may be, the outputs $X_1$, $Y_1$ of the two pick-off means produced in response to a rate of turn $\omega$ of the craft about an axis and an acceleration $\alpha$ of the craft in the direction of the axis are given by the expressions $$X_1 = M\omega \qquad (1)$$
$$Y_1 = N\omega \qquad (2)$$

where the use of opposite signs indicates that the deflections of the ends of the shaft are in opposite directions and M and N are fixed constants determined by the design of the apparatus, M and N not necessarily being equal but being of the same sign. (The sign will be determined by whatever sign convention of measurement is adopted for the other quantities occurring in the expressions.) Similarly the outputs $X_2$, $Y_2$ that are produced by the two pick-off means in response to lateral acceleration of $\alpha$ of the support in the same direction are given by the expressions $$X_2 = A\alpha \qquad (3)$$
$$Y_2 = B\alpha \qquad (4)$$

where A and B are fixed constants determined by the design of the apparatus and of the same sign since a lateral acceleration causes both ends of the shaft to become deflected in the same sense. When there is both a rate of turn of the support about the direction in question, and an acceleration in that direction, the deflections X, Y of the ends of the shaft will be given by the equations $$X = M\omega + A\alpha \qquad (5)$$
$$Y = N\omega + B\alpha \qquad (6)$$

In order to derive from these outputs a measure of the rate of turn $\omega$ of the craft, it is merely necessary to combine these outputs in the proportions of B and −A in such a manner as to provide a resultant output $BX - AY$ or a quantity proportional to this. This output will be a measure of the rate of turn of the craft unaffected by the presence of lateral acceleration because $BX-AY$ is simply equal to $(MB+AN)\omega$. In other words, it is only necessary to multiply the outputs of the two pick-off means by fixed suitable factors determined by the design characteristics of the device and subtract one from the other in order to obtain a resultant signal from which any effects due to lateral acceleration have been eliminated so that the resultant signal is a true measure of the rate of turn of the support or craft.

It will readily be seen that the gyroscopic apparatus may also be used to detect and provide a measure of the lateral acceleration of the support in a direction normal to the rotor axis. For this purpose, the outputs of the two pick-off means are combined in the proportions of the fixed constants N and M so that those components of the two outputs that are due to bending of the shaft as a result of the gyroscopic reaction torques generated in response to a rate of turn of the support cancel each other. The resultant signal so obtained is $(NA+MB)\alpha$, or a quantity proportional to this, so that it depends only on the lateral acceleration of the support in the direction in question unaffected by the presence of a turn of the support about an axis in that direction, and therefore constitutes a measure of this lateral acceleration.

So far the operation of the device has been described in relation to the manner in which it effects measurements of the displacements of the ends of the shaft parallel to one particular direction, and it has been shown that the outputs from the pick-off means responsive to deflections of the two ends of the shaft parallel to that direction may be combined to furnish measures of the acceleration parallel to that direction and to the rate of turn about an axis in that direction. Preferably, however, the pick-off means are adapted to provide two signal outputs at each end of the shaft so that two of the outputs measure displacements of the two ends of the shaft parallel to one lateral direction, and the other two outputs measure displacements of the two ends of the shaft parallel to another lateral direction at right angles to the first lateral direction. From those measurements may be obtained signals that are measures of the rates of turn of the support or craft about two axes in those directions and signals that are measures of the lateral accelerations of the support or craft parallel to the two directions.

When the apparatus is mounted on a craft with its axis parallel to the longitudinal axis of the craft the lateral acceleration that is measured by the apparatus is the lateral acceleration of that point of the craft at which the rotor is situated. Generally, however, one is not interested in the lateral acceleration of a particular point in a craft, but one may well wish to measure the lateral acceleration of the centre of gravity of the craft, since the acceleration of the centre of gravity is the quantity meant when one speaks merely of the acceleration of the craft. The location of the apparatus may have at any instant a lateral acceleration different from that of the centre of gravity of the craft if the craft at that instant has an angular acceleration about its centre of gravity. It may therefore be desired to "correct" the measure of lateral acceleration of the site of the apparatus along a given lateral axis obtained in the manner above described to derive a measure of the lateral acceleration of the craft itself along that axis, subtracting from the measure of lateral acceleration obtained, the lateral acceleration of the site along that axis relative to the centre of gravity of the craft. The quantity that must be subtracted is proportional to the spacing between the site and the centre of gravity of the craft as measured parallel to the rotor axis, and is also proportional to the angular acceleration of the craft about the second lateral axis (the axis perpendicular to that in which the accelerations are measured). Accordingly, apparatus according to the invention may include means for deriving from measures of the displacements of the two ends of the shaft parallel to one direction a quantity that measures the rate of turn of the craft about an axis in that direction, means for deriving from the said quantity another quantity measuring the angular acceleration of the craft about that axis, and combining this latter quantity with one that is derived from measures of the deflections of the shaft in a perpendicular direction, and measures the acceleration of the rotor in the latter direction, so that this measure of acceleration is corrected for angular acceleration of the craft in such a way that the corrected quantity is a measure of the acceleration of the centre of gravity of the craft.

Preferably the rotor, shaft, mountings, and pick-off arrangements, are symmetrically constructed and arranged so that the combining means for obtaining the measure of the rate of turn of the support or craft merely serves to subtract the signals provided by the two pick-off means, and the combining means for obtaining the measure of the lateral acceleration merely adds the outputs of the pick-off means. It will be appreciated that the deflections of the ends of the shaft of the rotor will include components that are due to the action of gravity. If the pick-off means are arranged to give zero output when the shaft is straight they will give outputs in normal operations which include components due to the action of gravity and the measure of the lateral acceleration will be a measure of the resultant of the lateral acceleration and the component of acceleration due to gravity. If for any purpose it is desired to provide a measure of the acceleration relative to the earth the output may be corrected by an amount proportional to the component that is due to gravity or the pick-off means may be arranged to give zero output when the ends of the shaft are deflected due to gravity alone.

An embodiment of the invention will now be described by way of example with reference to the accompanying drawings in which Figure 1 is a sectional view of a gyro unit.

Figure 3 is a schematic isometric projection of the unit showing the connections between pick-off devices and utilisation devices.

Figure 1:
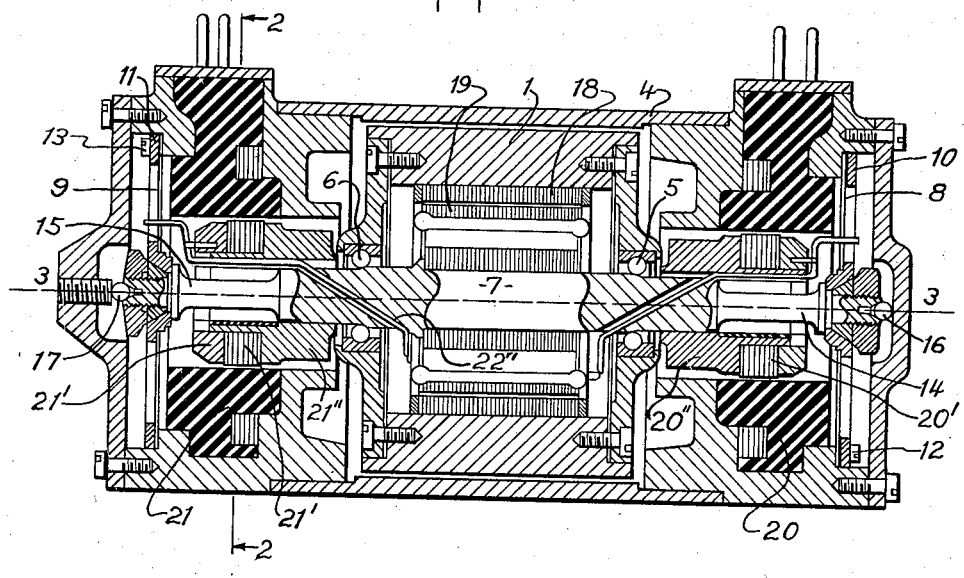

Referring to the drawings, Figure 1 illustrates a symmetrically constructed and arranged gyro unit comprising a rotor 1 mounted for spinning about an axis 3—3 in a support 4. The rotor 1 is mounted by means of ball bearings 5, 6 on a fixed shaft 7 which is mounted in the support 4 by means of a pair of flexible diaphragms 8, 9, rigidly attached to the support 4 by means of retaining rings 10, 11 and bolts 12, 13. Shaft 7 is provided with two end portions 14, 15 which are of smaller diameter than the central portion of the shaft so as to make the shaft slightly flexible, the flexure being permitted by the flexure of the flexible diaphragms 8, 9. End play of the shaft 7 is prevented by the balls 16, 17.

The rotor 18 is driven by an electric motor whose rotor is mounted on the gyroscope rotor 1 and whose stator windings 19 are fixed to the shaft 7, and energised from an A. C. source 46. Also shown in Figure 1 are two sets of inductive pick-off devices 20, 21 one at each end of the shaft 7 and each comprising 4 pairs of windings fixed with respect to the support 4 in quadrature around the axis 3—3. The circular armature 20', 21' of the pick-off devices are mounted on bobbins 20'', 21'' attached to the shaft 7. The set of pick-off devices 20 is arranged to detect displacement of the flexible end 14 of the shaft 7 and the set of pick-off devices 21 is arranged to detect displacement of the flexible end 15 of the shaft 7. Leads 22'' are provided for carrying electrical energy into the support 4 for energising the stator windings 19 of the motor driving the rotor 1 and for energising the pick-off devices 20 and 21.

The unit 4 is provided with connections (not shown) by means of which it may be attached to the craft or projectile so as to detect turning and/or lateral acceleration of the craft.

Figure 2:
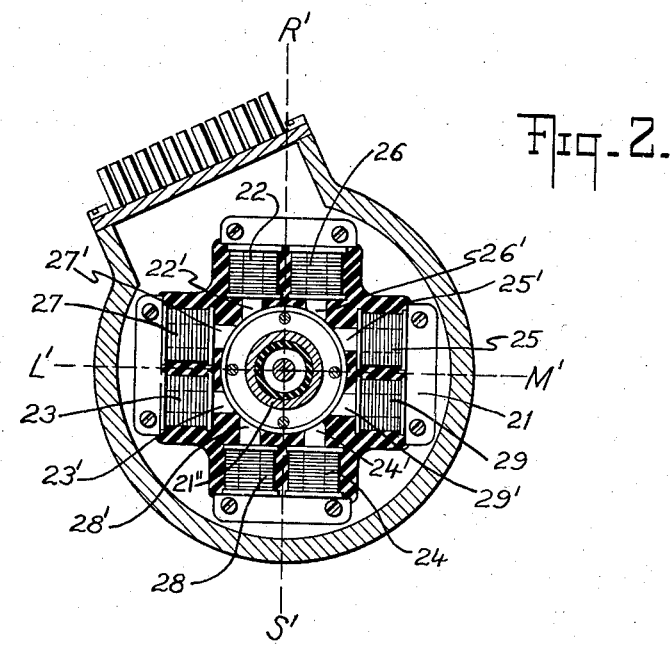
Figure 2 is a section through Figure 1 along the line 2—2.

Reference is now made to Figures 2 and 3 of the drawings. In Figure 2, the set of pick-off devices 21 shown on the left hand side of Figure 1 is shown in somewhat greater detail. The set of pick-off devices 20 is identical with the set of pick-off devices 21, so that it is only necessary to describe one set. As shown, the set of pick-off devices 21 comprises four pairs of windings 22, 26; 25, 29; 24, 28; and 23, 27; disposed in quadrature around the flexible part 15 of the shaft 7. The windings 22, 26, are mounted on pole pieces 22′, 26′ of a U-shaped core and one of the windings 26 is connected to be energised from a source of alternating voltage 38. The pair of windings 25, 29 are mounted on the pole pieces 25′, 29′ of a U-shaped core and the winding 29 is connected to be energised from the source of alternating voltage. The windings 24, 28 are mounted on the pole pieces 24′, 28′ of a U-shaped core and the winding 28 is connected to be energised from the source of alternating voltage 38. The windings 23, 27 are mounted on the pole pieces 23′, 27′ of a U-shaped core and the winding 27 is connected to be energised from the source of alternating voltage. The ends of the eight pole pieces are curved as shown so as to have a common centre and the armature 21′ of the pick-off devices which constitutes a plurality of circular laminations of radio metal fixed on the bobbin 21″ co-operates with the various pole pieces to produce variations in the flux linkage in the windings 22, 23, 24, 25. Thereby alternating voltages are produced in these windings which depend on the relative position of the armature 21′ and the pole pieces as determined by the position of the shaft 7.

As shown, the pick-off devices are arranged in quadrature to detect displacements of the armature 21′ along two mutually perpendicular axes R′—S′, L′—M′ both of which are perpendicular to the axis 3—3 of the rotor shaft 7. The outputs from the windings 22 and 24 are to be combined and accordingly the arrangement is such that when the armature 21′ is in its central position, the combined output from the windings 22, 24 is zero. Similarly, the outputs from the windings 23 and 25 are to be combined and the arrangement is such that when the armature is in its central position the combined output from these two windings is zero. The combined output voltage from the windings 22 and 24 provides a measure in magnitude and sense, of the displacement of the armature from its zero position in a plane containing the axis R′—S′ and the axis 3—3. The combined output voltage from the pick-off windings 23, 25, provides a measure, in magnitude and sense, of the displacement of the armature 21′ in a plane containing the axis L′—M′ and the axis 3—3 of the shaft 7.

As has been stated, the set of pick-off devices 20 on the right hand side of Figure 1 is identical with the set of pick-off devices 21 on the left hand side and accordingly need not be described in detail. The windings of the set of pick-off devices 20 are shown in Figure 3 with those of the set of pick-off devices 21. It need only be stated in connection with them that the windings 34, 35, 36 and 37 are connected to be energised from the source of alternating voltage 38 and the pick-off windings 30, 31, 32, 33 provide alternating voltages in dependence on the displacement of the armature 20′ from its central position. The outputs of the windings 30, 32, are combined to provide an output voltage that is a measure, in magnitude and sense, of the displacement of the armature 20′ from its zero position in a plane containing the axis R″—S″ and the shaft axis 3—3 and the outputs of the pickoff windings 31, 33 are combined to provide an output voltage that is a measure, in magnitude and sense, of the displacement of the armature 20′ in a plane containing the axis L″—M″ and the shaft axis 3—3.

As will be seen from Figure 3, the voltages from pick-off windings 23, 25, after rectification and addition, provide an output voltage between the lead 39 and the earth lead 43 of a magnitude and polarity dependent on the displacement of the armature 20′ from its zero position in a plane containing the axis L′—M′ and the shaft axis 3—3. Similarly, the output voltages from the pick-off windings 22, 24, after rectification and addition, provide an output voltage between the lead 40 and the earth lead 43 of a magnitude and polarity dependent on the displacement of the armature 21′ from its zero position in a plane containing the axis R′—S′ and the shaft axis 3—3. Similarly, the output voltages from the windings 30, 32, after rectification and addition, provide an output voltage between the lead 41 and the earth lead 43, of a magnitude and polarity dependent on the magnitude and direction of displacement of the armature 20′ from its zero position in a plane containing the axis R″—S″ and the shaft axis 3—3. Finally, the output voltages from the pick-up windings 31, 33, after rectification and addition, provide an output voltage between the lead 42 and the earth lead 43 that of a magnitude and polarity dependent on the magnitude and direction of displacement of the armature 21′ from its zero position in a plane containing axis L″—M″ and the shaft axis 3—3.

The output voltages between the earth lead 43 and the leads 39, 40, 41, 42 may be utilised to provide measures of the accelerations of the unit 4 in the directions of the axes L—M, R—S, and to provide measures of the rate of turn of the unit 4 about the directions of the axes R—S, L—M. These two axes substantially intersect at the centre of symmetry of the gyro unit. If an acceleration occurs in the direction of the axis L—M, the shaft 7 will be deflected so as to form a shallow U, this being permitted by the flexible ends 14, 15 and the flexure of the flexible diaphragms 8, 9. The displacement of the ends 14, 15 of the shaft 7, and therefore of the armatures 20′, 21′, will accordingly be in the same direction in a plane containing axes L′—M′ and L″—M″. Again, if a rate of turn of the unit 4 occurs about the direction L—M, deflections of the ends 14, 15 will be produced due to restrained precession of the rotor 1 about the axis R—S. However, in this case the displacements of the ends 14, 15 of the shaft 7 will be in opposite directions since the shaft will take up the form of a shallow S but the displacement will be in the same plane containing the axes L′—M′, L″—M″. In the first case, assuming symmetry, each displacement will be equal and will be a measure, in magnitude and sense, of the acceleration of the unit along the direction L—M and in the latter case, each displacement will be a measure of the magnitude of the rate of turn about the direction R—S but the deflections will be of opposite senses.

If a rate of turn occurs about the direction R—S and an acceleration occurs in the direction L—M, the deflections of the shaft 7 will be constituted of composite displacements in the plane containing the axes L′—M′, L″—M″, due to the acceleration and to the rate of turn. One end of the shaft 7 will be displaced through an amount proportional to the sum of displacements corresponding to the acceleration and rate of turn whilst the other end of the shaft will be displaced through an amount proportional to the difference of displacement corresponding to the acceleration and rate of turn. From this it will be obvious that the voltage derived between the lead 39 and the earth lead 43 is the sum of two voltages that are measures of the acceleration $\alpha_1$ along the direction L—M and the rate of turn $\omega_1$ about the direction R—S and that the voltage between the lead 42 and the earth lead 43 is the sum of two voltages that are measures of the acceleration along the direction L—M and the rate of turn about the direction R—S. These voltages are indicated as $A\alpha_1 + M\omega_1$ and $A\alpha_1 - M\omega_1$ respectively where A and M are constants. Therefore, if these voltages are added, it will be possible to obtain a measure of the magnitude and sense of the acceleration in the direction L—M. Similarly, if the voltages are subtracted, it will be possible to obtain a measure in magnitude and sense of the rate of turn about the direction R—S. For this purpose, the voltages between the leads 39, 42 and the earth lead 43 are applied to summing amplifiers 44, 44' to provide output voltages of magnitude and polarity that are measures of the magnitude and sense of the acceleration along the direction L—M and the rate of turn about the direction R—S.

Similar considerations apply to accelerations occurring in the direction of the axis R—S and rates of turn about the direction L—M and it will be readily apparent that the output voltages between the leads 40, 41 and the earth lead 43 will be, respectively, the sum of voltages that are measures of the acceleration $\alpha_2$ in the direction R—S and the rate of turn $\omega_2$ about the direction L—M and the difference of voltages that are measures of these two terms. These voltages are indicated as $A\alpha_2 + M\omega_2$ and $A\alpha_2 - M\omega_2$ respectively. These voltages are also applied to summing amplifiers 45—45' to derive therefrom voltages of a magnitude and polarity corresponding respectively to the magnitude and sense of the acceleration along the direction R—S and the rate of turn about the direction L—M.

The four voltages derived from the amplifiers 44, 45, 44', 45' which are measures, respectively, of the acceleration along the directions L—M, R—S and the rates of turn about these directions are applied to indicating meters 47, 48, 49, 50 to provide, respectively, indication of the acceleration $\alpha_1$ along the direction L—M, acceleration $\alpha_2$ along the direction R—S, rate of turn $\omega_1$ about the direction L—M, and rate of turn $\omega_2$ about the direction R—S.

Alternatively these four voltages may be applied as component signals in a servo amplifier forming part of an automatic control system for a craft or missile on which the apparatus may be mounted.

If the gyroscopic apparatus is mounted substantially at the centre of gravity of the craft angular acceleration of the craft about its athwartship or vertical axes will have substantially no deleterious effect. However, if the apparatus is mounted some distance away from the centre of gravity of the craft angular acceleration of the craft about an axis will produce deflections of the ends of the rotor shaft in the same plane in the same sense as if a pure lateral acceleration were acting. In such a case if it is desired to have a measure purely of the lateral acceleration or vertical acceleration of the centre of gravity of the craft, additional means is provided in the combining means for removing components in the outputs that are due to the angular acceleration about the axis referred to. Such additional means may comprise a differentiating network to which is applied an output of the combining means providing the rate of turn about the axis referred to to provide an output that is proportional to the angular acceleration. This output is applied in the appropriate sense to neutralise the component in the combining means that is due to the angular acceleration of the craft.

The pick-off devices may be mounted on the inside or on the outside of the diaphragms.

In another embodiment of the invention the rotor is mounted in a rotor case which in turn is supported in the supporting frame by means of thin flexible shafts or thick wires connecting the rotor case with the instrument housing. Preferably, in this form of the invention, the supporting frame is filled with a fluid. The operation of such a modification would be similar to the embodiment already described with reference to the drawings, pick-off means being provided for detecting displacements of the ends of the rotor case from zero positions with respect to the pick-off means.

What we claim is:

1. Gyroscopic apparatus for producing measures of the rate of turn and/or linear acceleration of a craft, comprising a supporting frame adapted to be mounted on a craft, a gyro unit journalled therein including a rotor mounted for spinning about an axis in said frame and having an elastic shaft extending beyond said rotor at both ends, a flexible mounting at both ends of said shaft permitting bending thereof, a pick-off at each end of said shaft responsive to bending of each end in one plane and producing a signal proportional to the acceleration force producing such bending, and means for differentially combining said signals to produce a signal proportional to the sum and a signal proportional to the difference of said first-named signals.

2. Gyroscopic apparatus as claimed in claim 1, wherein the mounting for each end of the shaft comprises a flexible diaphragm rigidly attached to the support and to the center of which one end of the shaft is attached.

3. Gyroscopic apparatus as claimed in claim 1, wherein the shaft is made slightly flexible by making each end of the shaft of smaller diameter than the central portion.

4. A gyroscopic rate of turn indicator comprising a supporting frame, a gyro unit journalled therein including a rotor mounted for spinning about an axis in said frame and having an elastic shaft extending beyond said rotor at both ends, a flexible mounting at both ends of said shaft permitting bending thereof, said bending producing displacements of portions of said shaft normal to said axis in opposite directions in response to angular precession of said rotor, a pick-off at each end of said shaft each producing a signal proportional to and of a sense indicative of the direction of such bending, and a rate of turn indicator connected to receive both of said signals and controlled in accordance with the difference thereof.

5. A gyroscopic accelerometer comprising a supporting frame, a gyro unit journalled therein including a rotor mounted for spinning about an axis in said frame and having an elastic shaft extending beyond said rotor at both ends, a flexible mounting at both ends of said shaft permitting bending thereof, said bending producing displacements of portions of said shaft normal to said axis in the same direction in response to accelerations normal to said axis, a pick-off at each end of said shaft each producing a signal in proportion to and of a sense indicative of the direction of the bending of said shaft, and an acceleration indicator connected to receive both of said signals and controlled in accordance with the sum thereof.

6. A gyroscopic accelerometer for measuring lateral accelerations of the support along axes mutually perpendicular to one another and to the spin axis of the gyroscope as claimed in claim 5, having an additional pair of pick-offs at each end of the rotor shaft to detect bending thereof in a plane at right angles to the plane in which said other pick-offs are effective, means for combining the outputs of the corresponding pick-offs at each end of the shaft to produce a signal in response to displacement of the two ends of the shaft in the opposite angular sense in the same lateral plane and indicators actuated from each pair giving the linear acceleration in each of said lateral planes.

7. A gyroscopic rate of turn indicator for measuring rate of turn about two perpendicular axes as claimed in claim 4, having an additional pair of pick-offs at each end of the rotor shaft mounted to detect bending thereof in a plane perpendicular to the plane in which said first-named pick-offs are effective, means for combining the outputs of the corresponding pick-offs at each end of the shaft to produce a signal in response to displacement of the two ends of the shaft in the same angular sense, and an indicator actuated from each pair giving a signal proportional to the rate of turn about each of said first mentioned axes.

8. A rate of turn gyroscope adapted to measure turn rates about two axes comprising a support, a rotor journalled therein for spinning about an axis normal to said other axes, said mounting means including a resilient shaft fixed at its two ends in said support, a pair of pick-off means at each end of said shaft for generating distinguishable signals upon bending of said shaft with respect to said support about each of said first mentioned axis, and a rate of turn indicator actuated from the difference of said signals from the two ends of the shaft and a linear accelerometer actuated from the sum of said signals.

9. Gyroscopic apparatus for use in detecting and providing measures of movements of a vehicle comprising a supporting frame carried by said vehicle, a gyro rotor, a shaft for rotatably supporting said rotor for spinning about an axis in said frame, said shaft having deformable, elastic ends, flexible means for supporting said shaft in said frame whereby to permit bending of each end of said shaft, said bending producing displacements of portions of said shaft normal to said axis in opposite directions upon precession of said rotor due to angular rates of turn of said craft and in the same direction due to lateral movement of said rotor with respect to said axis in response to linear accelerations of said craft, pick-off means at each end of said shaft for providing outputs in accordance with such bending of said shaft ends, and means responsive to the difference of said outputs for providing a measure of the rate of turn of the craft and means responsive to the sum of said outputs for providing a measure of the linear acceleration of said craft.

References Cited in the file of this patent

UNITED STATES PATENTS

| | | |
|---|---|---|
| 2,133,809 | Carter et al. | Oct. 18, 1938 |
| 2,407,657 | Esval | Sept. 17, 1946 |
| 2,414,102 | Hull et al. | Jan. 14, 1947 |
| 2,452,335 | Stoner | Oct. 26, 1948 |
| 2,479,122 | Konet | Aug. 16, 1949 |
| 2,484,823 | Hammond | Oct. 18, 1949 |
| 2,514,250 | Meredith | July 4, 1950 |
| 2,567,682 | Silbertstein | Sept. 11, 1951 |
| 2,689,723 | Von Basel | Sept. 21, 1954 |
| 2,695,165 | Hansen | Nov. 23, 1954 |